US007026738B1

(12) United States Patent
Lynch et al.

(10) Patent No.: US 7,026,738 B1
(45) Date of Patent: Apr. 11, 2006

(54) QUAD SHAFT CONTRAROTATING HOMOPOLAR MOTOR

(75) Inventors: William A. Lynch, Philadelphia, PA (US); Neal A. Sondergaard, Severna Park, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 11/033,619

(22) Filed: Jan. 13, 2005

(51) Int. Cl.
*H02K 31/00* (2006.01)
*H02K 16/00* (2006.01)
*B60L 11/02* (2006.01)
*B63H 21/17* (2006.01)

(52) U.S. Cl. .................... 310/178; 310/114; 440/6
(58) Field of Classification Search ............... 310/112, 310/114–115, 118–119, 122, 177–178
See application file for complete search history.

(56) References Cited

U.S. PATENT DOCUMENTS

| 3,229,133 | A | * | 1/1966 | Sears ..................... 310/178 |
| 3,579,005 | A | * | 5/1971 | Noble ..................... 310/178 |
| 3,944,865 | A | * | 3/1976 | Jewitt ..................... 310/178 |
| 4,086,506 | A | * | 4/1978 | Kustom et al. ............ 310/74 |
| 4,275,323 | A | * | 6/1981 | Hatch ..................... 310/178 |
| 4,385,251 | A | * | 5/1983 | Mallick et al. ............ 310/178 |
| 4,975,609 | A | * | 12/1990 | McKee .................... 310/178 |
| 6,628,036 | B1 | | 9/2003 | Lynch et al. |
| 2004/0248479 | A1 | * | 12/2004 | Hein et al. .................. 440/6 |
| 2005/0009418 | A1 | * | 1/2005 | Ries et al. ................... 440/6 |
| 2005/0042944 | A1 | * | 2/2005 | Brach et al. ................. 440/6 |

OTHER PUBLICATIONS

Lynch et al. ILIR Presentation, 19 pages, Jul. 30, 2004.

* cited by examiner

*Primary Examiner*—Burton Mullins
(74) *Attorney, Agent, or Firm*—Jacob Shuster

(57) ABSTRACT

A homopolar motor features radially inner and outer pairs of axially aligned rotor drums to which axially aligned drive shafts are respectively connected and extend therefrom through an outer motor housing to drive a corresponding number of propellers located in axial spaced relation to each other outside of the housing for rotation about a common axis. A magnetic shield is fixedly mounted within the housing to enclose the rotor drums within a magnetic field established by disk and ring magnets positioned within the radially inner pair of the rotor drums. Current collector brushes maintain electrical contact between the rotor drums and a source of DC electrical energy supplied through a power input tube to the magnetic shield from a location between opposite axial ends of the housing. The drive shafts journaled within the housing extend from either opposite axial ends of the housing or from only one axial end of the housing to the propellers.

5 Claims, 2 Drawing Sheets

QUAD SHAFT CONTRAROTATING HOMOPOLAR MOTOR

STATEMENT OF GOVERNMENT INTEREST

The invention described herein may be manufactured and used by or for the Government of the United States of America for governmental purposes without the payment of any royalties thereon or therefore.

The present invention relates generally to a homopolar type electric motor having four propeller drive shafts.

BACKGROUND OF THE INVENTION

Homopolar motors and machines are generally known in the art, as referred to for example in U.S. Pat. No. 6,628,036 B1, issued Sep. 30, 2003. Such homopolar motors produce differential DC torque within a uniform magnetic field. It is an important object of the present invention to provide a single relatively small homopolar type motor through which two sets of contrarotating drive shafts are provided.

SUMMARY OF THE INVENTION

Pursuant to the present invention, two pairs of coaxial contrarotating drive shafts of a homopolar motor are respectively connected to a pair of axially aligned outer rotor drums and a pair of axially aligned inner rotor drums within the outer drums. The rotor drums are positioned by bearings within a dipole magnetic field established within an outer shield fixed to the motor housing into which DC electrical current is conducted by wiring connected to annular conductors. The magnetic field is established by neodymium iron permanent magnets centrally positioned by bearings within the inner rotor drums. Toroidal current collector brush devices maintain electrical contact between the annular conductors and between the two pair of drums for electrically powered drive of the four drive shafts to which propellers may be connected outside of the motor housing either at opposite axial ends thereof or at one axial end thereof.

BRIEF DESCRIPTION OF THE DRAWING

A more complete appreciation of the invention and many of its attendant advantages will be readily appreciated as the same becomes better understood by reference to the following detailed description when considered in connection with the accompanying drawing wherein.

DETAILED DESCRIPTION OF PREFERRED EMBODIMENTS

Figure 1:
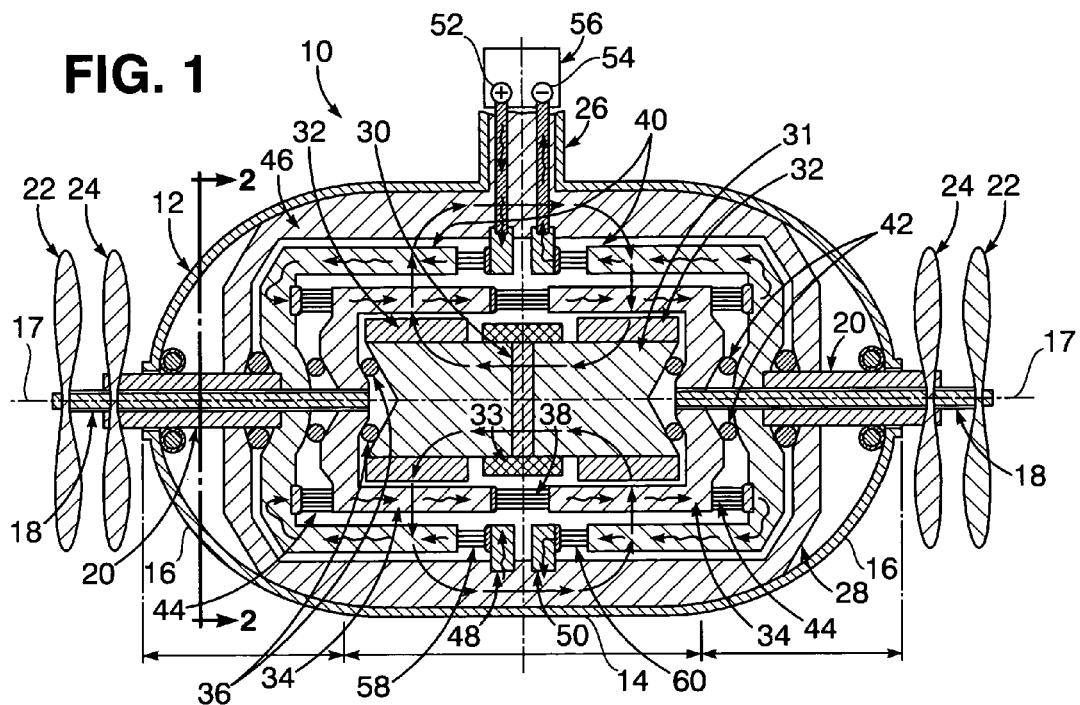
FIG. 1 is a side section view through a homopolar motor constructed in accordance with one embodiment of the present invention.
Figure 2:
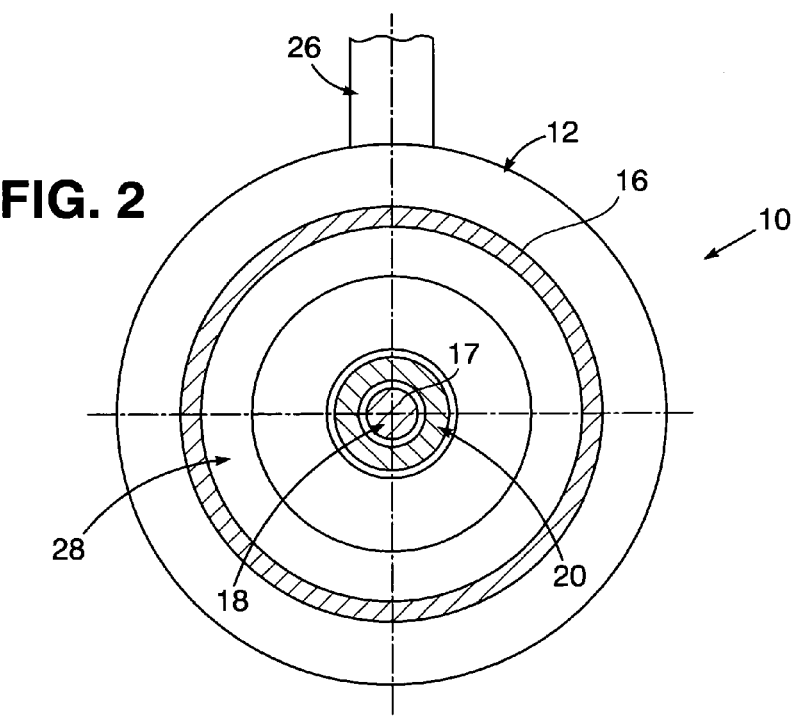
FIG. 2 is a transverse section view taken substantially through a plane indicated by section line 2—2 in FIG. 1.

Referring now to the drawing in detail, FIGS. 1 and 2 illustrate a podded propulsor application of a homopolar type of electric motor 10, having an outer pod housing 12 formed by an axially intermediate cylindrical section 14 from which a pair of curved-shaped end sections 16 extend axially in opposite directions about a common axis 17. According to one embodiment, a pair of concentric power driven shafts 18 and 20 project from each of the two axial end sections 16 of the pod housing 12, with propellers 22 and 24 respectively attached to the shafts 18 and 20 at their axial ends for rotation about the axis 17 in close axially spaced relation to each other as shown in FIG. 1. Accordingly, the motor 10 features a power driven symmetrical dipole field arrangement through which the shafts 18 and 20 extend at the opposite axial ends of the pod housing 12. Electrical energy for simultaneous powered drive of the motor shafts 18 and 20, respectively in opposite rotational directions about the axis 17, is supplied to the motor 10 as hereinafter explained through a power input tube 26 extending laterally from the intermediate section 14 of the housing 12 at a right angle hereto.

With continued reference to FIGS. 1 and 2, the two pairs of contrarotating power shafts 18 and 20 are configured as part of a push-pull podded type of propulsor. The pod housing 12 serves primarily as a hydrodynamic shell as shown in FIG. 1. An inner shell 28 is positioned within the outer pod housing 12 to provide additional bearing support and structure. The motor 10 includes a centrally located magnetic field establishing disk magnet 30 made of neodymium iron positioned in the center of a ferromagnetic core 31, with a pair of anisotropic radial ring type of Neodymium iron magnets 32 positioned thereon. An optional field winding 33 is also shown positioned between the magnets 32 enclosed between a pair of radially inner cylindrical rotor drums 34 in axial alignment with each other to which the two inner shafts 18 are respectively connected and extend axially therefrom in opposite directions toward the two propellers 22. The rotor drums 34 are respectively supported for rotation relative to the radial ring magnet 32 by bearings 36 and are in electrical contact with each other through toroidal current collector brush devices 38 which may be made of fibers of a suitable metal such as silver by way of example. A pair of radially outer rotor drums 40 are positioned in axial alignment with each other about the radially inner rotor drums 34 for rotation independently thereof under rotational support thereon by bearings 42. The two outer tubular drive shafts 20 are respectively connected to the outer rotor drums 40, which are in electrical contact with each other through toroidal current collector brush devices 44. The rotor drums 34 and 40 with the magnets 30 and 32 therein are enclosed within an outer magnetic flux shield portion 46 of the outer housing 12 which may serve as an additional magnetic shield if made of steel. A pair of closely spaced annular conductors 48 and 50 are fixedly mounted internally on the flux shield portion 46 of the housing 12, from which wiring extends through the power input tube 26 to positive and negative terminals 52 and 54 of a DC electric power source 56 as diagrammed in FIG. 1. Electrical current is according conducted into and out of the outer rotor drums 40 through toroidal current collector brush devices 58 and 60 respectively associated with the annular conductors 48 and 50.

It will be apparent from the foregoing description that electrical energy in the form of DC current will enter the motor 10 through the conductor 48 and the brush devices 58 into the outer rotor drums 40 for rotation of the propellers 24 through the tubular drive shafts 20. The electrical current is simultaneously conducted through the brush devices 44 into the inner rotor drums 34 for counterrotation of the propellers 22 by the inner drive shafts 18. Such rotation of the two pairs of propellers 22 and 24 is well suited for use in four-wheel drive vehicles for marine propulsion, for electric aircraft or for equipment heretofore utilizing multiple electric motors.

Figure 3:
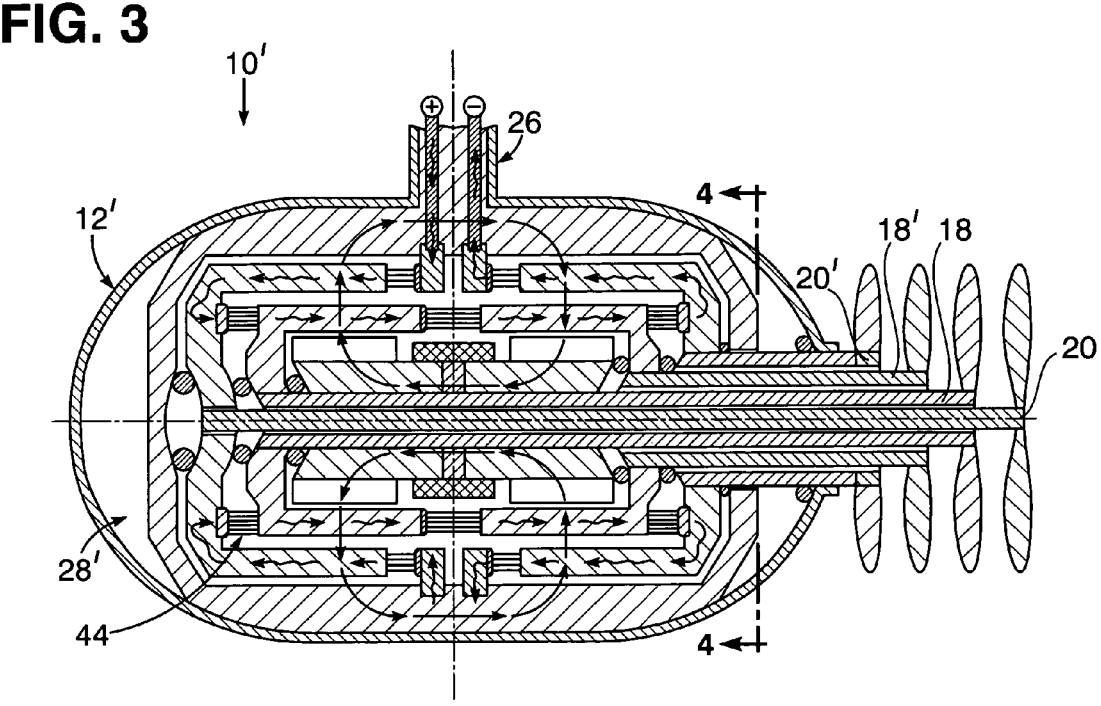
FIG. 3 is a side section view through a homopolar motor constructed in accordance with another embodiment of the present invention.
Figure 4:
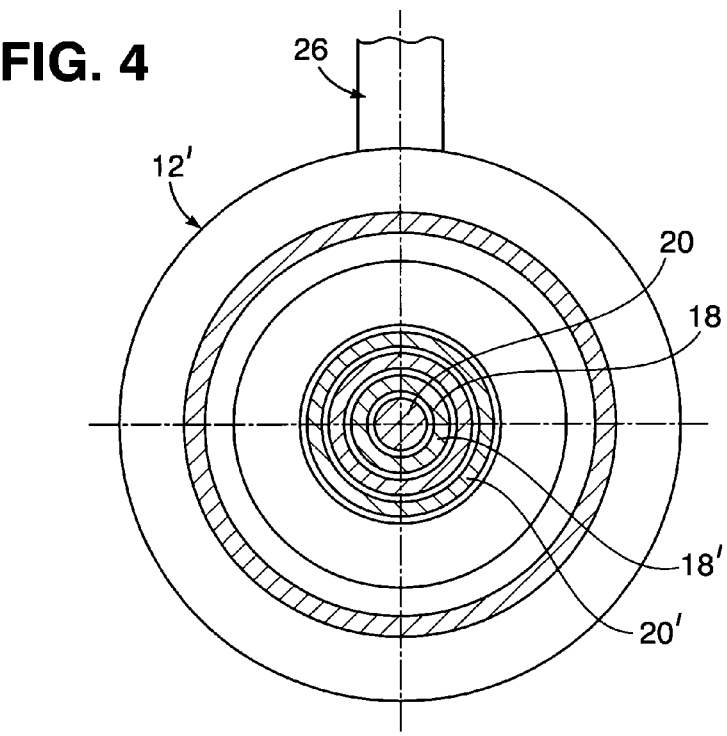
FIG. 4 is a transverse section view taken substantially through a plane indicated by section line 4—4 in FIG. 3.

According to another embodiment as shown in FIGS. 3 and 4, a homopolar motor 10', generally similar to the motor 10 hereinbefore described, has an outer housing 12' closed at one axial end. The power input tube 26 extends laterally from the housing 12'. Powered drive is effected by a tractor pod propulsor motor 28' for all four propeller drive shafts 18, 18', 20 and 20' extending axially therefrom in one axial direction from an open end of the outer housing 12'.

According to other embodiments, the brush devices 44 may be sealingly covered with solid, liquid or gas additives thereabout. The brush devices 44 may furthermore consist of a continuous ring of fibers or axially assembled brush elements. While the motor 10 as hereinbefore described features one pair of motor drive shafts 18 and 20 connected to opposite axial ends of the one pair of rotor drums 34 and 40, any other number of rotor drum pairs and corresponding number of pairs of motor drive shafts connected thereto may be utilized pursuant to the present invention. Furthermore, each of the rotor drums may be formed by any number of electrically insulated conductive cylinders providing additional electrical turns with an additional corresponding number of current collectors. Such multi-turn rotor arrangement will provide for a high voltage motor. Also the field winding 33 between the ring magnets 32 may be eliminated, and the core 31 radially enlarged along opposite end portions thereof to replace the ring magnets 32 positioned thereon. As to the fiber type of current collector brush devices hereinbefore described, they may be replaced by other suitable types of current collector devices which include foils or liquid metal.

Obviously, still other modifications and variations of the present invention may be possible in light of the foregoing teachings. It is therefore to be understood that within the scope of the appended claims the invention may be practiced otherwise than as specifically described.

The invention claimed is:

1. In combination with a source of DC electrical energy, a homopolar motor comprising; an outer housing having opposite axial ends; a magnetic shield internally fixed to the housing enclosing a magnetic field therein between said axial ends thereof; a pair of radially outer rotor drums rotationally supported within said magnetic field; a pair of radially inner rotor drums rotationally supported within the radially outer rotor drums; permanent magnet means positioned within the radially inner rotor drums for establishing said magnetic field; brush means for establishing electrical contact between said source of DC electrical energy and the rotor drums to impart contrarotation of each of said pairs of the rotor drums relative to the permanent magnet means; and coaxial propulsion drive shafts respectively connected to each of the rotor drums within the housing and extending axially outside of the housing from said opposite axial ends thereof.

2. The combination as defined in claim 1, including a plurality of propellers respectively connected to the propulsion drive shafts in axially spaced relation to each other outside of the housing.

3. The combination as defined in claim 1, wherein all of the propulsion drive shafts extend from one of the axial ends of the housing outside thereof.

4. In combination with a source of DC electrical energy, a homopolar motor comprising; an outer housing having opposite axial ends; a magnetic shield internally fixed to the housing to enclose a magnetic field therein between said axial ends thereof; a pair of radially outer rotor drums rotationally supported within the magnetic shield; a pair of radially inner rotor drums rotationally supported within the radially outer rotor drums; permanent magnet means positioned within the radially inner rotor drums for establishing said magnetic field; brush means for establishing electrical contact between said source of DC electrical energy and the rotor drums for imparting contrarotation of each pair of the rotor drums; coaxial drive shafts respectively connected to each of the rotor drums within the housing and extending axially therefrom outside of the housing; and a plurality of propellers respectively connected to the drive shafts in axially spaced relation to each other outside of the housing; wherein two pairs of the coaxial drive shafts respectively extend to outside of the housing from the opposite axial ends thereof.

5. In combination with a source of DC electrical energy, a homopolar motor comprising; an outer housing having opposite axial ends; a magnetic shield internally fixed to the housing to enclose a magnetic field therein between said axial ends thereof; a pair of radially outer rotor drums rotationally supported within the magnetic shield; a pair of radially inner rotor drums rotationally supported within the radially outer rotor drums; permanent magnet means positioned within the radially inner rotor drums for establishing said magnetic field; brush means for establishing electrical contact between said source of DC electrical energy and the rotor drums for imparting contrarotation of each pair of the rotor drums; and coaxial drive shafts respectively connected to each of the rotor drums within the housing and extending axially therefrom outside of the housing; wherein two pairs of the coaxial drive shafts respectively extend to outside of the housing from the opposite axial ends thereof.

* * * * *